United States Patent
Borodaev et al.

(10) Patent No.: US 7,361,392 B2
(45) Date of Patent: Apr. 22, 2008

(54) PACKAGING FROM A POLYMER FILM FOR FOOD PRODUCTS

(75) Inventors: Sergei Vasilievich Borodaev, Rostov-na-Donu (RU); Oleg Vladimirovich Davidenko, Rostov-na-Donu (RU); Alexandr Vladimirovich Davidenko, Rostov-na-Donu (RU); Sergei Petrovich Ryzenko, Rostov-na-Donu (RU)

(73) Assignee: OOO PKF "Atlantis-Pak" (RU)

( * ) Notice: Subject to any disclaimer, the term of this patent is extended or adjusted under 35 U.S.C. 154(b) by 100 days.

(21) Appl. No.: 10/671,489

(22) Filed: Sep. 29, 2003

(65) Prior Publication Data

US 2004/0062889 A1    Apr. 1, 2004

Related U.S. Application Data

(63) Continuation of application No. PCT/RU02/00115, filed on Mar. 22, 2002.

(30) Foreign Application Priority Data

Mar. 30, 2001  (RU) ............................... 2001108416

(51) Int. Cl.
| | |
|---|---|
| A22C 13/00 | (2006.01) |
| A22C 13/02 | (2006.01) |
| B65B 53/00 | (2006.01) |
| B32B 1/08 | (2006.01) |
| A23L 1/31 | (2006.01) |
| B65D 81/34 | (2006.01) |

(52) U.S. Cl. .................. 428/34.9; 428/34.8; 428/35.2; 428/35.5; 428/36.9; 428/327; 138/118.1; 206/802; 426/105; 426/113

(58) Field of Classification Search ............... 428/34.8, 428/35.2, 35.5, 36.9, 327; 138/118.1; 206/802; 426/105, 113; 525/56–61, 178–184, 54.21; 524/401, 436, 606
See application file for complete search history.

(56) References Cited

U.S. PATENT DOCUMENTS

| | | | | |
|---|---|---|---|---|
| 3,329,509 | A | * | 7/1967 | Julius .......................... 523/100 |
| 4,243,074 | A | * | 1/1981 | Strutzel et al. ........... 138/118.1 |
| 4,289,171 | A | * | 9/1981 | Rassbach .................... 138/145 |
| 4,851,245 | A |   | 7/1989 | Hisazumi et al. ........... 426/105 |
| 5,084,310 | A |   | 1/1992 | Hisazumi et al. ............. 428/34 |
| 6,054,209 | A | * | 4/2000 | Imanishi et al. ............ 428/327 |
| 6,372,339 | B1 | * | 4/2002 | Murakami et al. .......... 428/343 |
| 6,589,615 | B1 | * | 7/2003 | Yen ........................... 428/34.8 |
| 6,617,381 | B1 | * | 9/2003 | Kumaki et al. ............. 524/112 |

FOREIGN PATENT DOCUMENTS

| | | |
|---|---|---|
| DE | 1717062 | 6/1970 |
| DE | 2724252 | 11/1978 |
| EP | 0005765 A1 | 12/1979 |
| EP | 0139888 A1 | 5/1985 |
| EP | 0252597 A2 | 1/1988 |
| EP | 0640289 A2 | 3/1995 |
| EP | 0920808 A1 | 6/1999 |
| EP | 0994168 A2 | 4/2000 |
| WO | WO 9403544 A1 * | 2/1994 |

* cited by examiner

*Primary Examiner*—Alicia Chevalier
*Assistant Examiner*—Christopher P Bruenjes
(74) *Attorney, Agent, or Firm*—Jacobson Holman PLLC

(57) ABSTRACT

A polymer film is disclosed for effectively smoking and/or drying products packed therein, which are to be smoked and/or air dried, in particular, smoked cheeses, smoked, uncooked smoked, and air-and-sunshine dried sausages, meat and fish products. This single-layer film is produced on the base matrix of an aliphatic polyamide and/or copolyamide and/or terpolyamide and contains 4.0-50.0 wt % of a hydrophilic compound which is in a highly dispersed state, wherein the hydrophilic compound forms a disperse phase with a linear size of the domain being 0.1-3.0 μm in a direction perpendicular to the plane of the film, and either a polymer compound or a low-molecular substance-salt, may be used as such.

8 Claims, 7 Drawing Sheets

PACKAGING FROM A POLYMER FILM FOR FOOD PRODUCTS

This is a continuation of PCT/RU02/00115 filed Mar. 22, 2002 and published in English.

FIELD OF THE INVENTION

The present invention relates to packaging film which has sufficiently high permeability in respect to smoke substances and/or to water vapors in order to provide the possibility for effective smoking and/or drying products packed therein and intended for smoking and/or air drying, in particular, smoked cheeses, smoked, uncooked smoked sausages and air dried sausages, jerked meat and fish products.

BACKGROUND OF THE INVENTION

Traditionally, natural casings of animal intestines, and also synthetic casings on the base of collagen and cellulose, having high steam and smoke permeability, are used as casings for smoked sausage products. However, natural intestine casings are an expensive and scarce product, and furthermore are subject to bacterial spoilage. The production of cellulose and collagen synthetic casings is based on low-productive and multistage solution technologies related to the use of such toxic materials as carbon disulfide and formaldehyde and presumes a large amount of harmful liquid wastes. This results in a relatively high cost of such casings.

Due to the above-mentioned reason, a desirable aim is the development of synthetic analogues of the described casings, which analogues would be produced by highly productive extrusion methods.

Linear aliphatic polyamides or mixtures thereof with other polymers such as an ionomer resin, modified ethylene vinyl acetate copolymers and/or modified polyolefins are disclosed in EP No. 0 139 888, published 8 May 1985 as polymer materials suitable for making smokable casings. Wherein, the glass transition temperature of the polymer material decreases depending on the absorption of water. Under conditions of "wet" smoking the products obtain proper fragrance and taste. These casings readily pass the smoke substances, have excellent mechanical properties and low gas permeability. However, due to low vapor permeability they cannot be used instead of natural, collagen or cellulose casings and they purport obtaining therein a somewhat different, more moist product than traditionally smoked sausage.

A casing for smoked food products, suitable for both smoking and for storing therein cured products, i.e. having high barrier properties in respect to oxygen and vapor, is disclosed in U.S. Pat. No. 5,084,310, published 25 Jan. 1992. The packaging material comprises at least one layer of a mixture of 5-60 wt. % of polyvinylidene chloride (PVDC) and 95-40 wt. % of polyamide. In order to increase the gas barrier properties of the film, PVDC is introduced into a smokable polyamide. A copolymer, mainly consisting of vinylidene chloride, preferably a copolymer of 65-98 wt. % of vinylidene chloride and 2-35 wt. % of a monomer capable of forming a copolymer with vinylidene chloride, for example, vinyl chloride, (met)acrylic acid, acrylonitrile, is used as the PVDC. A polyamide, having a low melting point, not exceeding 210° C., is used as the polyamide to be mixed with the PVDC. Nevertheless, this casing does not pass the smoke substances to a sufficient degree and has high barrier properties in respect to water vapors. A sensor test on the capability for the products to be smoked in this casing shows fragrance and taste of the smoked product to be approximately at the level of a casing of pure polyamide but significantly worse than in the case of a cellulose casing.

In U.S. Pat. No. 4,851,245, published 25 Jul. 1989, smokable films are produced from a mixture of 50-80% polyamide (PA) with a melting point of 120-210° C. and 20-50% of a copolymer of ethylene and vinyl alcohol. Polyamide 6.66, polyamide 612 or mixtures thereof are claimed as the polyamides. The packaging film has good smoke permeability, which in this patent is evaluated according to the permeability in respect to vapors of methanol, but it was not the object of this invention to increase the moisture permeability of this film, made in the form of a tubular casing. Moreover, in one of the embodiments of the invention the casing comprises a moisture impermeable polyolefin layer.

A film for smoking and storage is disclosed in EP No. 0 252 597, published 13 Jan. 1988. This film is made of a blend of polymers in an amount of 80-98 wt. % and additives in an amount of 2-20 wt. %, wherein the polymer mixture consists in turn of 30-100 wt. % of polyamide and 0-70 wt. % of polyolefins. This additive that actually is a plasticizer, is compatible with the polymer components, dissolves in water and/or oil and is in a liquid state at 70-95° C., which makes it possible for it in the process of successive heating to sweat in the inner and/or outer surface of the film, after which the film becomes vapor and gas impermeable, as if it is made from the same polymer materials, but with no additive. The following are used as an additive: aliphatic alcohols, polyglycols, esters of polyoxyethylenesorbitane and fatty acid, esters of polyatomic alcohols, esters of dibasic aliphatic acids, esters of polyvalent oxycarboxylic acids, ethers of aliphatic acids and epoxy plasticizers. Impairment of the mechanical properties, which may result in rupture of the film when sausage is being stuffed into the casing, relates to drawbacks of these strongly plasticized films. Furthermore, premature sweating of the plasticizer on the outer surface may result in impairment of the printing ink adhesion, and inside—may promote the acquirement of a foreign taste by the product packed in the film.

The most pertinent prior art is EP No. 0 920 808, published 9 Jun. 1999 which discloses a film used for packing cooked processed meat products, such as sausage and ham, and also for cheeses, in the case where they are smoked and subjected to heat treatment. The film is prepared either from acetate-propionate cellulose or a mixture thereof with polyamide with a weight ratio of the first to the second being 5-90:95-5, preferably 5-30:95-70 with a thickness of from 5 to 90 μm, wherewith the film in accordance with the invention has a permeability in respect to water vapor equal to 300-363 g/m² per day. However, the films described in the examples, which contain polyamide as the main component, have the permeability, which is not more than 300 g/m² per day. The polyamide may be PA 6.66, PA 11, PA 12, PA 612 or a mixture thereof. Furthermore, the film may contain as an additive 0.1-10.0 wt. % of cellulose powder, which enhances its smokability. Smoking is carried out in the presence of water or water vapor. However, the concrete films described in the examples do not have sufficient water vapor permeability so that the effective loss of moisture is ensured and the sausage product is provided with the necessary consistency.

SUMMARY OF THE INVENTION

An object of the instant invention is to develop a reliable, inexpensive synthetic food film that has sufficiently high permeability in respect to smock substances and/or water vapors, in order to provide the possibility for the effective smoking and/or drying of a product packed therein during preparation according to traditional food processing.

Another object of the instant invention is to develop a synthetic food film that has barrier properties in respect to oxygen, at least at the level of the using polyamide matrix under conditions of low humidity.

The next object of the instant invention is to develop a synthetic food film that has good mechanical properties together with the capability of providing quality smoking and/or air drying.

These objects are achieved in that a polymer film for food products comprises a polyamide matrix and a component providing high permeability in respect to smoke substances and/or water vapors, wherein the aforesaid component is a hydrophilic compound in an amount of 4.5-50.0 wt. %, forming in the polyamide matrix a highly dispersed phase with a linear domain size of 0. 1-3.0 µm in a direction perpendicular to a plane of the film, and capable of being compatible with at least 10 wt. % of water, wherein:
- it is advisable that aliphatic polyamide, copolyamide or terpolyamide be used as the polyamide matrix;
- polyamide 6 and/or copolyamide 6.66 and/or copolyamide 69 and/or copolyamide 612 and/or terpolyamide 6/66.9 and/or terpolyamide 6/66.12 is used as the polyamide matrix;
- polymers selected from homopolymers and/or copolymers of vinylpyrrolidone, vinyl alcohol, alkyloxazoline, polyacrylamide, cellulose ethers, alkylene glycols, polyalkylene oxides, acrylic acid, methacrylic acid, vinyl alcohol ethers, vinyl alcohol esters are used as the hydrophilic compound; the aforesaid homopolymers and/or copolymers may be water-soluble;
- water-soluble low-molecular substances are used as the hydrophilic compound;
- substances selected from inorganic salts, salts with an organic anion and an inorganic cation are used as the water-soluble low molecular substances;
- the film may additionally contain plasticizers and/or dyes and/or pigments and/or antiblocking and/or technological additives;
- the film may be made unoriented;
- the film may be made with single-axis orientation;
- the film may be made with biaxial orientation;
- the polymer film may be made in the form of a seamless tubular casing or packet, wherewith the form given to the polymer film depends on the food products to be placed therein. Thus, in the case of packing fish or solid cheese, it is advisable to use packets, while in the case of producing different forms of smoked sausage or melted cheese—a tubular casing.

BRIEF DESCRIPTION OF THE DRAWINGS WHICH ILLUSTRATE THE ESSENCE OF THE INVENTION

FIG. 2 shows a cut of a film prepared in accordance with example No. 1;

FIG. 3 shows a cut of a film prepared in accordance with example No. 2;

FIG. 4 shows a cut of a film prepared in accordance with example No. 3;

FIG. 6 shows a cut of a film prepared in accordance with example No. 6.

FIG. 5 shows a cut of a film prepared in accordance with example No. 4;

FIG. 7 shows a cut of a film prepared in accordance with example No. 10.

Figure 1:
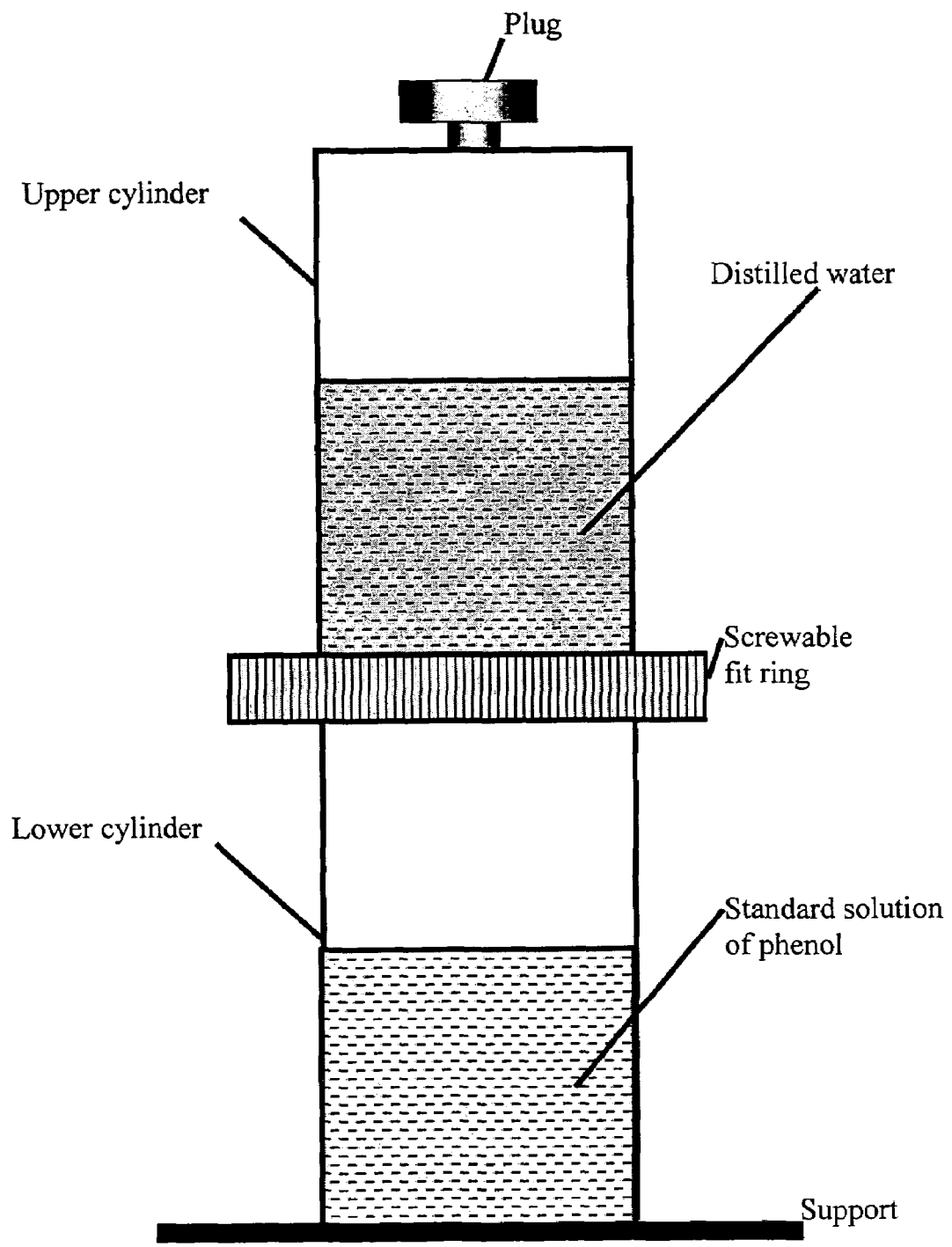
FIG. 1 shows an external view of the apparatus for determining phenol permeability of a flat sample of film.

The data presented in FIGS. 2-7 illustrate the morphology of polymer mixtures of prepared films, but in respect to some, as proof of the high phase dispersity, data are provided on the optical properties of the film (opalescence). In example 1, in spite of the direct confirmation of the existence of a separate highly dispersed phase of polyvinyl pyrrolidone (PVP) by electronic microphotographs, opalescence is not observed, and this, obviously, is related to the close values of the indexes of refraction of PVP and PA 6.66.

DETAILED DESCRIPTION OF THE PREFERRED EMBODIMENTS

In the process of working on the instant invention, we unexpectedly discovered a certain relationship between the distribution of the hydrophilic additive in the polymer matrix and the capability of this mixture to pass water vapors and smoke components. This relationship will be illustrated in the examples below. It was found that if such a compound is physically compatible with the main polymer, just like as if it will form therein a rough dispersion (the size of additive domains is comparable with the thickness of the film and is 10-40 µm), then a significant increase of the vapor and smoke permeability is not observed. Compatibility is understood to mean the capability of two or more components to form liquid or solid systems that are homogeneous on a molecular level. This concept includes both the swellability and solubility. A domain is understood to mean a continuous region of a homogeneous (at the micro level) composition. To the contrary, in the case where the hydrophilic compound forms a highly dispersed phase, a sharp increase of these parameters is observed. Obviously, this effect is related to penetration of the hydrophilic phase domains of a certain size into the compact surface layer of the polymer film, the fact of existence of which is well known to specialists. It is clearly manifested on the presented electronic microphotographs in the form of a dark strip having a thickness of up to 3 µm. The appearance of this layer is usually related to the speed gradient of the flow of the polymer during die and orientation drawing, as a result of which the surface layers of the film are oriented to a greater degree and they have greater density and crystallinity. In the case of polyamide, this layer is "barrier," since it has substantially reduced hydrophily and,consequently, moisture permeability, this determining the moisture permeability of the polyamide film as a whole. Apparently, it is just because of this that in the cases where the hydrophilic compound is compatible with polyamide and where the size of the phase domains of the additive substantially exceeds the thickness of the "barrier" layer and they are wholly positioned outside the "barrier" layer, the "flow" of the polymer material during the stretching bends round a large size defect and in that case a significant changing the vapor and smoke permeability of the film is not observed. And only when the domain of the hydrophilic phase have a size, which is comparable with the thickness of the "barrier" layer, the total permeability does significantly increase. A condition for such dispersity is the close affinity of the hydrophilic compound to polyamide, this affinity being expressed in its optimum solubility in the polyamide melt. However, the affinity should not be so close that it results in their miscibility (the absence of the separated phase of a hydrophilic compound) in a solid state.

In order to enhance the performance of the film, its composition may include plasticizers, dyes, pigments, antiblocking and technological additives. Packaging films may be oriented and unoriented. They may be bent by stretching or setting, if it is necessary to obtain sausage with a certain curvature.

Forming the polymer mixture into a tubular casing may be carried out by any of the known methods, for example, extrusion through an annular die directly into a tubular casing or by extrusion through a flat-slit die and obtaining first a flat sheet and subsequently preparing a tubular casing therefrom.

During the production of a packet, a section of a tubular film of the necessary length is sealed at one end.

Films produced by the facile one-stage processing of polymer feedstock have excellent mechanical properties, which make it possible to give a shape to the products packed therein and to maintain that shape in the process of production and storage. Furthermore, no rupture of a film produced in the form of a seamless tubular casing occurs when it is stuffed under pressure.

The proposed film is suitable for packing and subsequently smoking cheese, smoking and/or air drying meat and fish products during their production in accordance with traditional technologies. It makes it possible to prepare products with the required remaining content of moisture for the time provided by the technology of production of the said food products. Air drying is understood to mean a loss of moisture in the process of preparing the product.

Due to the fact that the proposed film in a moist state becomes gas permeable, it may be used during the preparation of uncooked smoked sausages, the process of preparation of which includes fermentation which requires aerobic conditions and is accompanied by the release of $CO_2$. After the curing process is over, when the humidity of the sausage-meat is reduced to low values, the film will again acquire gas-barrier properties.

The packaging film produced in the form of a packet may be used for products, the preparation of which presumes their being cut and subsequently dried at room or at a higher temperature, for example, dried fruits.

In respect to the properties of the film of the present invention, it does not make any difference in which form—flat sheet, tubular casing or packet—it is produced.

The smoke permeability of a film was evaluated as the permeability in respect to phenol—one of the main constituents of the smoke components. The extraction method of determining the phenol permeability of sausage casings is described below.

Phenol permeability is characterized by the concentration of phenol, which has passed through the casing from a standard solution into an aqueous extract under predetermined conditions.

Determination of the phenol permeability of a flat sample of film is carried out with the aid of a special apparatus (FIG. 1), which is a unit consisting of two chambers divided by the casing, a KFK-2 photo-electrocalorimeter and a pH-meter.

The apparatus is placed in a drying cabinet preliminarily heated to 85° C., where it is held for 80 min, wherein there is a solution for determining phenol permeability in the lower chamber, 100 ml of distilled water in the upper. The concentration of the phenol is determined in the solution from the upper chamber of the unit, wherefore it is extracted with butyl acetate. The standard solution of phenol is prepared by the dissolution of 0.1 g of freshly-distilled crystalline phenol in 50 ml of ethyl alcohol. The solution for determining the phenol permeability is prepared from 10 ml of a standard solution of phenol with the addition of 1 ml of acetic acid and with the volume brought to 100 ml with distilled water. The weight concentration of phenol in the sample being analyzed is found by a preliminarily plotted calibration curve. The calibration relationship is plotted in the coordinates: weight concentration of phenol, µg/ml—optical density of the sample minus the optical density of a blank experiment. The optical density of the extract is measured in vessels 5 cm long with a photoelectrocolorimeter at $\lambda=490$ nm in respect to a pure solvent.

Preferable embodiments of the invention are shown in the following examples.

EXAMPLE 1

A mixture comprising 90 wt. % of granulated PA 6.66 ("Ultramid C35" BASF brand) and 10 wt. % of polyvinyl pyrrolidone (trademark "Poviden" commercially available from BASF) is loaded into an extruder and melted. The melt with a temperature of 230-235° C. is extruded through an annular die and a primary tube is formed. Then at a temperatures of 60° C. it is subjected to biaxially-orientational drawing with air-blowing (double-bubble process), wherein the coefficient of longitudinal stretch is 2.6, lateral—3.0. After that, the tubular film having a caliber of 24 mm and a thickness of 19-21 µm is subjected to relaxation annealing at a temperature of 160-180° C. for 15 sec, cooled to 20° C. and wound into a roll.

Figure 2:
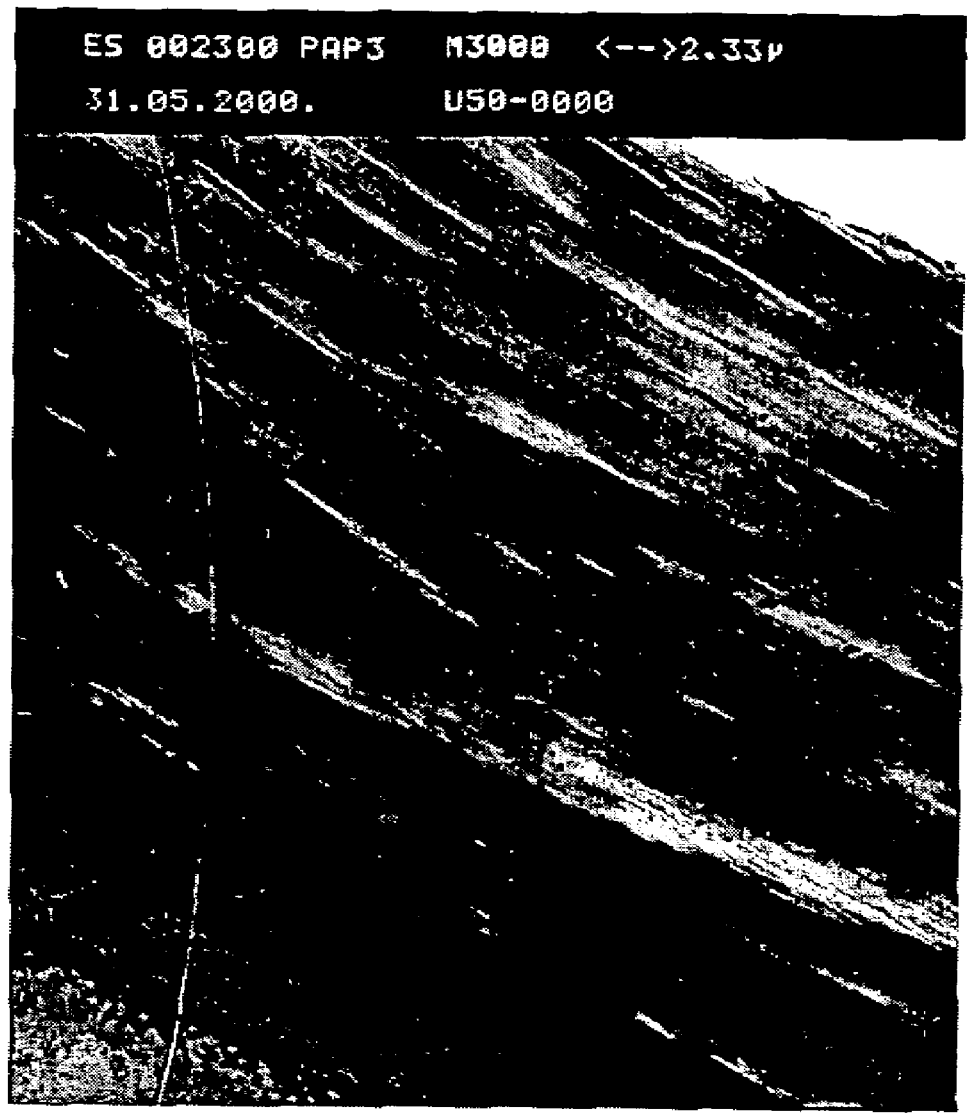
FIGS. 2-4, 6 show scanned electronic microphotographs of microcuts of film (thickness of cut 5000 Å), held for 2 sec in water and made with the aid of a "DEH 345" penetrating electronic microscope.

Spaces with a cross section of 0.1-0.2 µm, formed at the place of the water-soluble phase, are clearly seen in FIG. 2.

Then the tubular casing is used in the production of two kinds of cured sausage.

Method 1. Preparation of Semi-smoked Sausages

The casing described above is packed with the sausage stuffing for the semi-smoked sausages. The prepared sausage is held (set) for 24 hours at a temperature of 3° C., dried and browned for 1 hour at a temperature of 95° C. Then it is smoked with the smoke of smoldering birch sawdust for 5 hours at a temperature of 45° C. and relative humidity of 95%, after which it is dried at a temperature of 11° C. for 36 hours.

Method 2. Preparation of Uncooked Smoked Sausages

The casing is packed with sausage stuffing for uncooked smoked sausages. The prepared sausage is held in a ripening chamber for six days at a temperature of from 24° C. to 18° C. and a relative humidity which gradually decreases during that period from 98 to 90% in order to carry out fermentation of the stuffing. Then it is smoked with the smoke of smoldering birch sawdust for 5 hours at a temperature of 20-25° C. and relative humidity of 85%, after which it is dried at a temperature of 15-12° C., gradually reducing the relative humidity from 85 to 74% during 25 days.

Polymer films, prepared in accordance with the examples presented below were used for the preparation of semi-smoked sausages according to method 1 and uncooked smoked sausages according to method 2.

COMPARISON EXAMPLE 2

The casing is produced in accordance with example 1, wherewith 4 wt. % of polyvinyl pyrrolidone is introduced as the hydrophilic compound.

Figure 3:
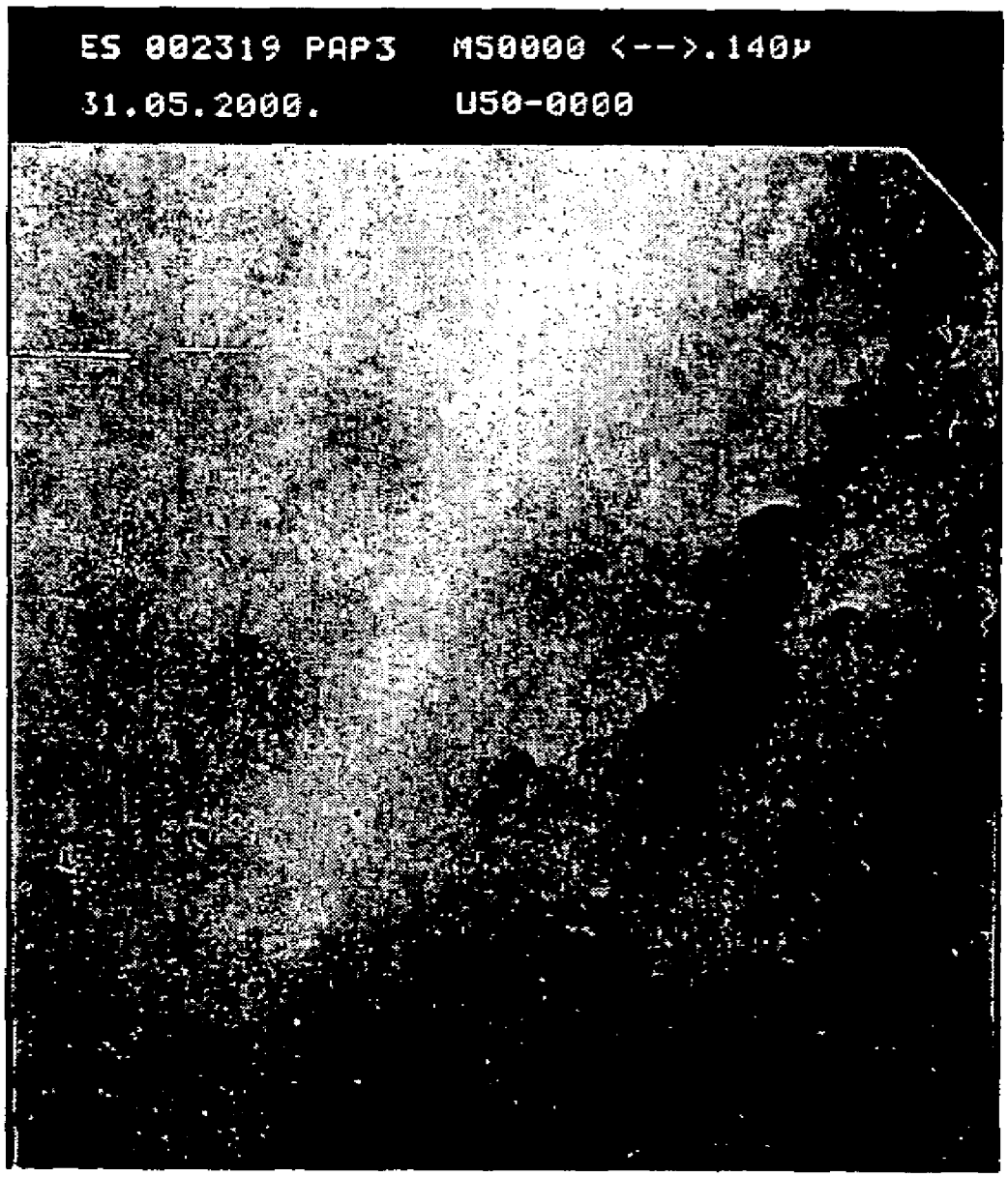
Figure 4:
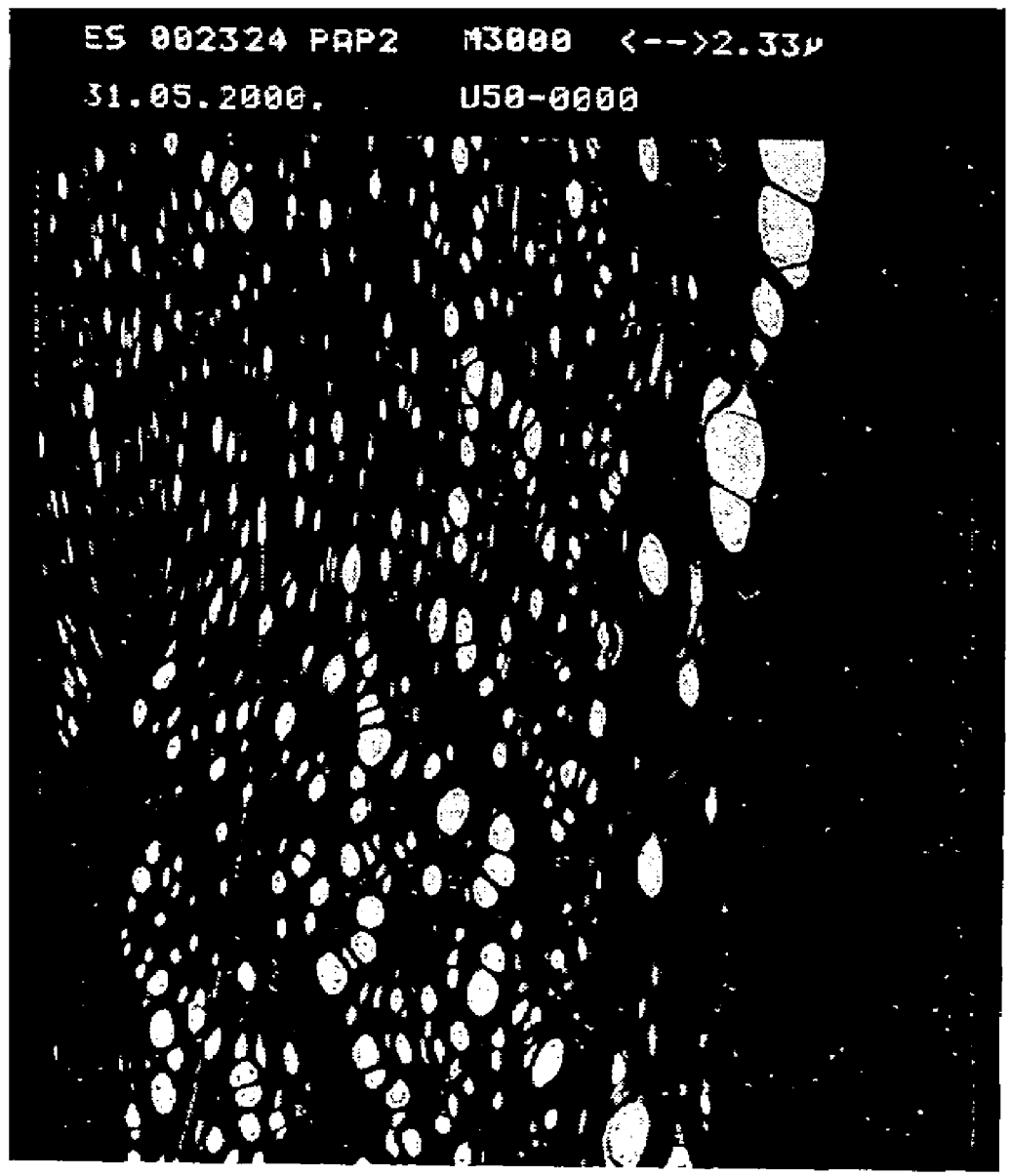
Figure 5:
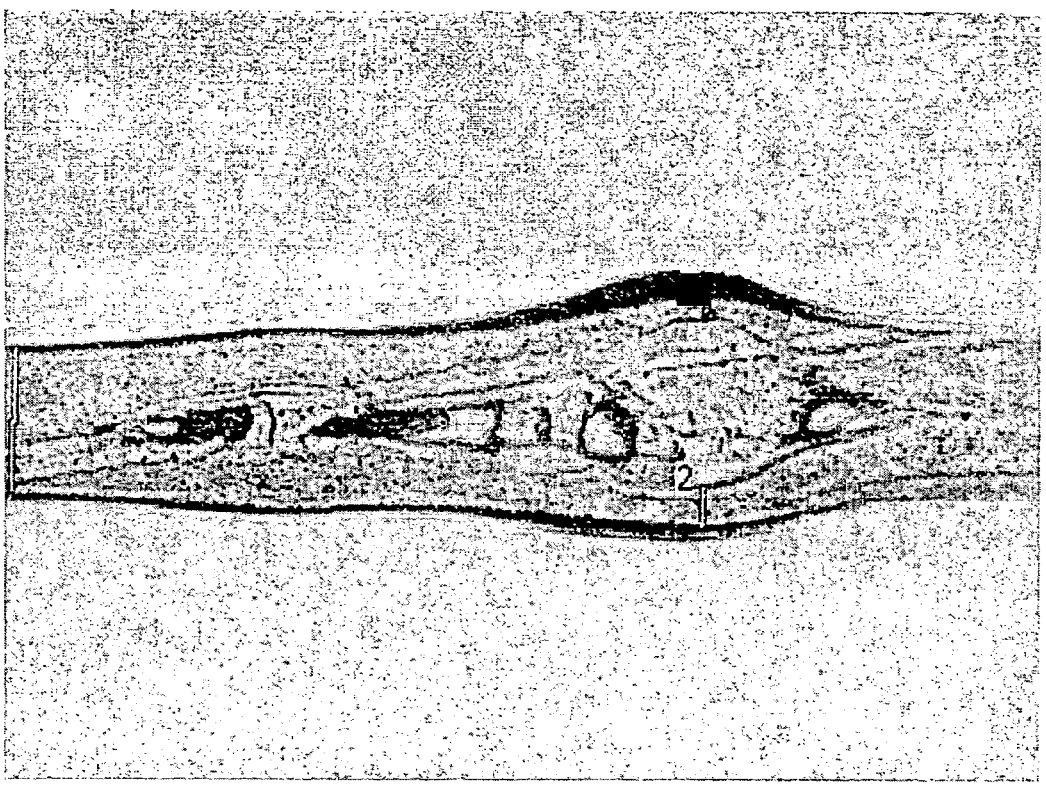
FIGS. 5, 7 show an optical microphotograph of a cut (50000 Å) of a prepared film, the microphotograph made with the aid of a "Geneval" Karl Zeiss Jena optical microscope.

A continuous medium, which does not contain any voids, is clearly seen in FIG. 3.

EXAMPLE 3

The casing is produced in accordance with example 1, wherewith granulated PA 6 ("Ultramid B35") in an amount of 80 wt. % is used as the polyamide base matrix, the hydrophilic compound is 15 wt. % of polyvinyl alcohol (trademark "Mowiol 5-88" commercially available from Clariant) with a degree of saponification 88% and viscosity of a 4% aqueous solution being 5 centipoises, and a plasticizer—glycerin in an amount of 5 wt. %.

The obtained casing has an expressed opalescence, intensifying when moistened, which indicates the presence therein of a separate phase that is in a highly dispersed state. Voids having a cross-sectional size of 0.2-3.0 μm are clearly seen in FIG. 4, these spaces being formed at the point of water-soluble phase.

COMPARISON EXAMPLE 4

The casing is produced in accordance with example 3, wherein polyvinyl alcohol (trademark "Mowiol 6-98" commercially available from Clariant) is used with a hydrolysis degree of 98% and with viscosity of a 4% aqueous solution being 6 centipoises.

The casing has a lusterless appearance with marked rough inclusions. Roughly dispersed PVA domains with a size of 4-10 μm are clearly seen in FIG. 5. A general thickening of the shell is evident near especially large domains.

EXAMPLE 5

The casing is produced in accordance with example 1, wherein a polymer mixture is used which consists of 75 wt. % of granulated PA 6.66 ("Ultramid C35" BASF brand) and 25 wt. % of poly N-ethyl oxazoline with a molecular weight of 500000 (trademark "Aquazol-500" commercially available from Polymer Chemistry Innovations Inc.).

The obtained casing has an expressed opalescence, intensifying when moistened, which indicates the presence therein of a physical heterogeneity of the polymer mixture and, accordingly, its highly dispersed state.

COMPARISON EXAMPLE 6

The casing is produced in accordance with example 5, wherein 15 wt. % of poly N-ethyl oxazoline, "Aquazol-500", is used as the hydrophilic compound.

Figure 6:
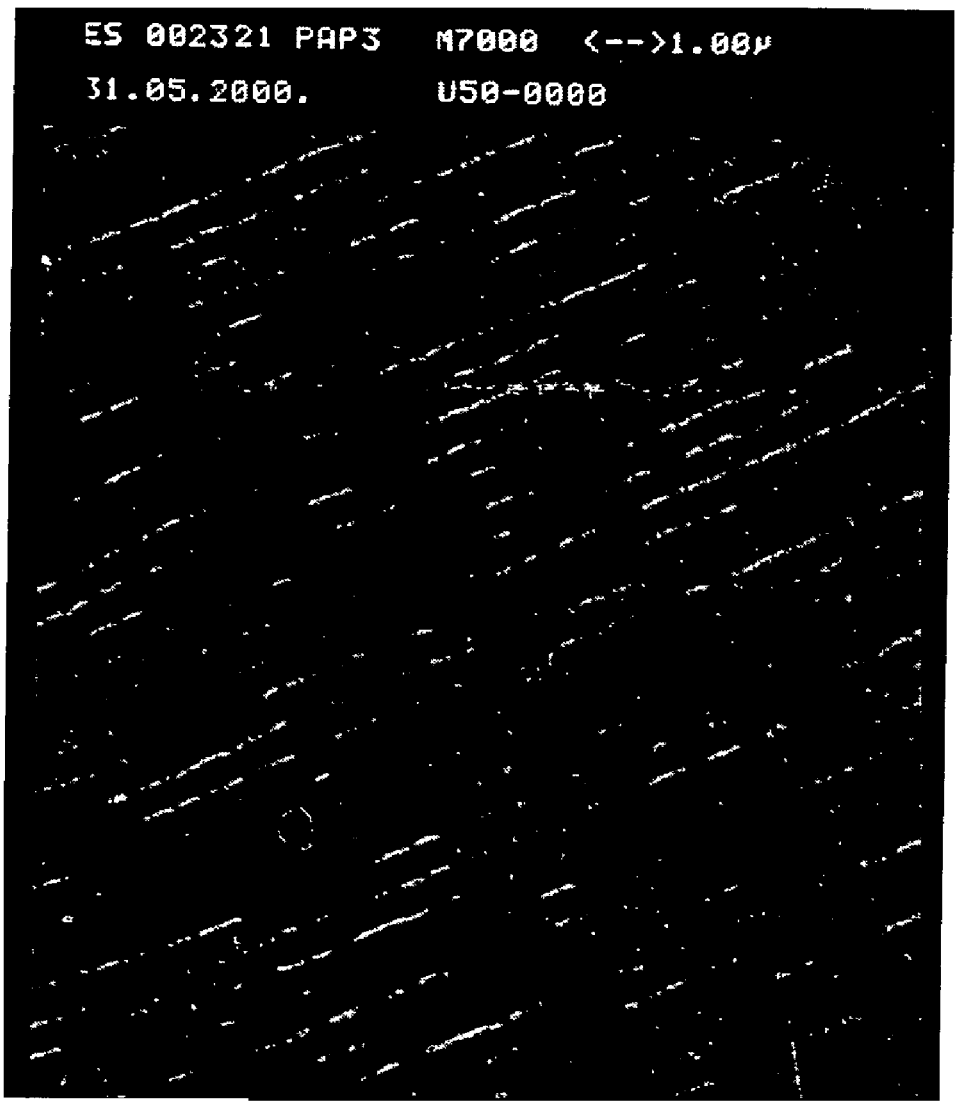
Figure 7:
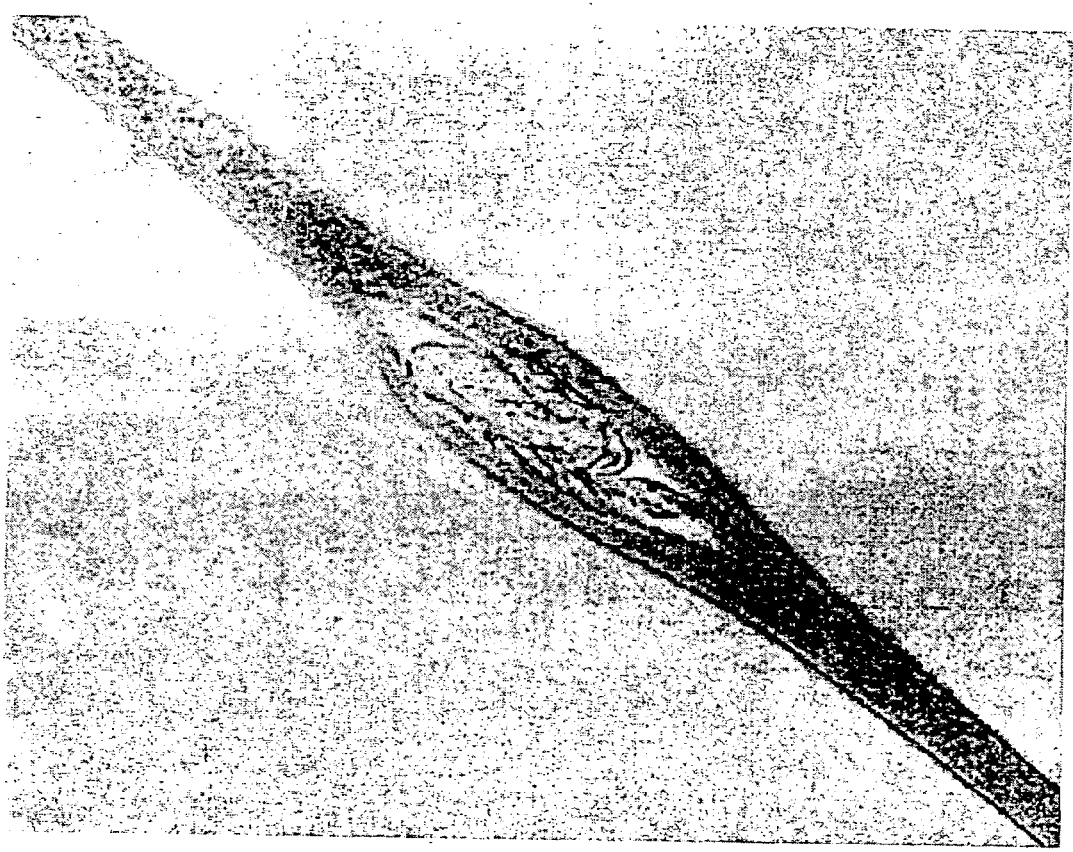

A polymer medium which does not have any empty spaces is shown in FIG. 6.

The prepared casing appears optically homogeneous, opalescence is not manifested even with moistening.

EXAMPLE 7

The casing is produced in accordance with example 1, wherein the polymer mixture consists of a mixture of 90 wt. % of granulated PA 6.66 ("Ultramid C35") and 10 wt. % of a mixture of sodium acetate/potassium acetate powders (40:60, $T_{melt}$ ~180° C.).

The obtained casing has an expressed opalescence, intensifying with moistening, which indicates the presence therein of a separate phase which is in a highly dispersed state.

EXAMPLE 8

The casing is produced in accordance with example 1, using wherein a polymer mixture consisting of 90 wt. % of granulated PA 6.66 ("Ultramid C35") and 10 wt. % of a mixture of sodium metaphosphate/potassium metaphosphate powders (50:50, $T_{melt}$ ~150° C.).

The obtained casing has an expressed opalescence, intensifying with moistening, which indicates the presence therein of a separate phase which is in a highly dispersed state.

EXAMPLE 9

The casing is produced in accordance with example 1, wherein the polymer mixture consists of 90 wt. % of granulated PA 6.66 ("Ultramid C35") and 10 wt. % of calcium chloride, compatible with a polyamide melt (see, for example, "Polyamides," edited by M. Kohan, N.Y., 1995, p. 439).

The casing has marked opalescence.

COMPARISON EXAMPLE 10

The casing is produced in accordance with example 1, wherein the polymer mixture is prepared from 90 wt. % of granulated PA 6.66 ("Ultramid C35") and 10 wt. % of sodium chloride powder, which is not compatible with polyamide in a viscous-flow and solid state.

The prepared casing has an expressed dullness and contains rough inclusions. Roughly dispersed NaCl crystals having a size up to 15 μm are clearly seen in FIG. 7. A general thickening of the casing is evident near especially large domains.

EXAMPLE 11

The casing is produced in accordance with the technology of example 1 from polyamide 6.66 ("Ultramid C35") without the addition of a hydrophilic compound.

The characteristics of all the produced films and the data in respect to their capability for smoking are summed up in the Table, wherein:

[1] Mechanical characteristics of the tubular casings were determined on a "Shimadzu AGS-H" autograph with a speed of moving the gripping devices apart equal to 100 mm/min.

[2] Water vapor permeation rate is determined at 30° C. and relative humidity of 65% in accordance with DIN 53 122-74.

[3] Phenol vapor permeation rate is determined at 85° C. on an apparatus described in accordance with the Method.

[4] Oxygen permeation rate is determined at 30° C. and relative humidity of 65% in accordance with DIN 53 380-69.

[5] ++ Presence of a dark crust of with a thickness of 0.5-1 mm, easily separated from the casing.

+ Presence of a dark crust with a thickness less than 0.5 mm, which can be separated from the casing.

− No dark crust present, loaf which is not swollen.

−− Swelling of casing during the stage of fermentation.

[6] ++ Clear fragrance and taste of smoking.

+ Weak fragrance of smoking.

− No fragrance of smoking.

[7] O—homogeneous.

RD—roughly dispersed.

HD—highly dispersed.

The data presented in the table clearly confirm the fact that films prepared in accordance with examples 1, 3, 5, 7-9, and containing a hydrophilic phase with the size of the domains within the range of 0.1-3.0 μm have higher permeability in respect to the smoke substances and/or water vapors as compared with films prepared in accordance with examples 2, 4, 6, 10, and ensure during smoking a good appearance and good taste of the sausages, while maintaining high mechanical properties.

i) forms in the polyamide matrix a highly dispersed phase with a linear domain size of 0.1-3.0 μm in a direction perpendicular to a surface of the casing in the polyamide matrix, and ii) is solid and soluble in water at 20° C., wherein the hydrophilic compound is a polymer selected from the group consisting of polyvinylpyrrolidone, polyvinyl alcohol, polyalkyloxazoline, polyalkylene glycol, polyvinyl alcohol ethers, polyvinyl ethers, cellulose ethers, and wherein the casing has the water vapor permeability estimated by DIN 53 122-74 of from about 450 to about 515 g/m² day and the permeability in respect of phenol of from about 110 to about 160 g/m² day, and the tensile strength of from about 148 to about 170 MPa.

2. The single-layer smokable tubular oriented and thermally fixed casing according to claim 1, wherein the polyamide matrix comprises aliphatic polyamide and/or copolyamide and/or terpolyamide.

3. The single-layer smokable tubular oriented and thermally fixed casing according to claim 2, wherein the ali-

| Characteristics | Examples | | | | | | | | | | | "Cutesin" thickness 60 μm |
|---|---|---|---|---|---|---|---|---|---|---|---|---|
| | 1 | 2 | 3 | 4 | 5 | 6 | 7 | 8 | 9 | 10 | 11 | |
| 1 | 2 | 3 | 4 | 5 | 6 | 7 | 8 | 9 | 10 | 11 | 12 | 13 |
| Tensile strength, MPa[1] | 151 | 155 | 164 | 162 | 148 | 153 | 169 | 170 | 163 | 171 | 167 | − |
| Elongation to break, % | 155 | 131 | 123 | 119 | 190 | 186 | 133 | 137 | 137 | 100 | 110 | − |
| Phenol vapor permeation rate, g/m² day[3] | 150 | 97 | 131 | 103 | 162 | 107 | 120 | 118 | 130 | 101 | 99 | 160 |
| Water vapor permeation rate, g/m² day[2] | 453 | 215 | 509 | 250 | 480 | 225 | 463 | 495 | 515 | 211 | 216 | 1200 |
| Oxygen permeation rate, cm³/m² atm. day[4] at 25° C.: | | | | | | | | | | | | |
| at relative humidity 60% | 29 | 8 | 17 | 21 | 21 | 30 | 28 | 25 | 18 | 20 | 27 | 800 |
| at relative humidity 95% | 120 | 48 | 115 | 60 | 126 | 63 | 110 | 279 | 284 | 55 | 54 | 950 |
| Loss of mass during smoking processing of sausage, %: | | | | | | | | | | | | |
| With method 1 | 10.6 | 6.2 | 12.8 | 5.1 | 9.8 | 6.0 | 10.2 | 9.9 | 10.1 | 5.8 | 5.3 | 13.5 |
| With method 2 | 11.2 | 8.1 | 14.5 | 6.3 | 12.5 | 7.5 | 13.0 | 12.1 | 14.0 | 6.8 | 6.3 | 15.5 |
| Appearance of sausage Stick[5], made according to: | | | | | | | | | | | | |
| Method 1 | ++ | − | ++ | + | ++ | − | + | + | ++ | − | − | ++ |
| Method 2 | ++ | −− | ++ | + | ++ | −− | + | + | ++ | −− | −− | ++ |
| Smoking fragrance test[6] Made according to | | | | | | | | | | | | |
| Method 1 | ++ | − | ++ | + | ++ | − | ++ | ++ | ++ | − | − | ++ |
| Method 2 | ++ | − | ++ | + | ++ | − | ++ | ++ | ++ | − | − | ++ |
| Morphology of hydrophilic additive | HD | O | HD | RD | HD | O | HD | HD | HD | RD | − | − |

The invention claimed is:

1. A single-layer smokable tubular oriented and thermally fixed casing for stuffing by pastry food, consisting essentially of a polyamide matrix and a component providing high permeability of the casing with respect to smoke substances and water vapors, wherein said component is a hydrophilic compound in an amount of 4.5-50.0 wt. % of the total weight of the casing, and said hydrophilic compound:

phatic polyamide and/or copolyamide and/or terpolyamide are selected from the group consisting of polyamide 6 and/or copolyamide 6.66 and/or copolyamide 69 and/or copolyamide 612 and/or terpolyamide 6/66.9 and/or terpolyamide 6/66.12.

4. The single-layer smokable tubular oriented and thermally fixed casing according to claim 1, wherein said film includes plasticizers and/or dyes and/or pigments and/or antiblocking and/or technological additives.

5. The single-layer smokable tubular oriented and thermally fixed casing according to claim 1, wherein said casing is made uniaxially oriented.

6. The single-layer smokable tubular oriented and thermally fixed casing according to claim 1, wherein said casing is made biaxially oriented.

7. The single-layer smokable tubular oriented and thermally fixed casing according to claim 1, wherein the hydrophilic compound is a single polymer selected from the group consisting of vinyl alcohol ethers, polyvinyl alcohol, alkylene glycols, cellulose ethers, and alkyloxazoline.

8. The single-layer smokable tubular oriented and thermally fixed casing according to claim 1, wherein the hydrophilic compound is a single polymer selected from the group consisting of vinyl alcohol ethers, alkylene glycols, cellulose ethers, and alkyloxazoline.

\* \* \* \* \*